United States Patent [19]

Alford

[11] 4,238,380

[45] Dec. 9, 1980

[54] DISODIUM ETHOXYLATED ROSIN HALF ESTERS OF SULFOSUCCINIC ACID AS FOAM STABILIZERS FOR LATICES AND COMPOSITIONS CONTAINING SAME

[75] Inventor: John A. Alford, Hanahan, S.C.

[73] Assignee: Westvaco Corporation, New York, N.Y.

[21] Appl. No.: 36,396

[22] Filed: May 7, 1979

[51] Int. Cl.³ .............................................. C09F 1/04
[52] U.S. Cl. ........................... 260/29.7 SQ; 260/97.5; 260/98; 260/400; 560/7
[58] Field of Search ................ 260/97.5, 98, 103, 104, 260/105, 400, 29.7 SQ; 560/7, 151

[56] References Cited

U.S. PATENT DOCUMENTS

| | | | |
|---|---|---|---|
| 1,984,713 | 12/1934 | Weiland | 560/7 |
| 1,984,714 | 12/1934 | Weiland | 560/7 |
| 3,640,882 | 2/1972 | Groves | 560/151 |
| 3,856,722 | 12/1974 | Vitalis | 260/42.47 |
| 3,948,822 | 4/1976 | Wietsma | 260/29.7 SQ |

*Primary Examiner*—Paul R. Michl
*Attorney, Agent, or Firm*—Richard L. Schmalz; Terry B. McDaniel

[57] ABSTRACT

The disodium ethoxylated rosin half esters of sulfosuccinic acid prepared from the 1-5 mole rosin ethoxylates are disclosed as foam stabilizers for a variety of latices as well as latex compositions containing same which are processable into a non-gelling, heat-curable solid foam suitable for use as foam carpet backing and the method of preparing the latex compositions.

17 Claims, No Drawings

DISODIUM ETHOXYLATED ROSIN HALF ESTERS OF SULFOSUCCINIC ACID AS FOAM STABILIZERS FOR LATICES AND COMPOSITIONS CONTAINING SAME

BACKGROUND OF THE INVENTION (1) Field of the Invention

This invention relates to the novel disodium salt of ethoxylated rosin half esters of sulfosuccinic acid prepared from 1–5 mole rosin ethoxylates which are useful as foam stabilizers in a latex composition. This invention also relates to styrene-butadiene and carboxylated styrene-butadiene latex compositions containing the foam stabilizers and a process for preparing said latex compositions which can be formed into a non-gelling, heat-curable solid foam suitable for use as a foam carpet backing.

(2) Description of the Prior Art

The conversion of an aqueous emulsion or dispersion of a polymer into a wet foam is made possible because of the fact that the polymer is dispersed in a continuous aqueous phase so that the emulsion is highly fluid and therefore can be foamed. Foaming of an emulsion, to convert the emulsion into a wet foam consisting of a mass of bubbles, is performed by subjecting the emulsion to mechanical action, for example by whipping the emulsion or by introducing or generating gas to form bubbles from the emulsion. At the instant when the mechanical foaming action stops, however, the wet foam starts to collapse because the emulsion, consisting of a dispersion of the polymer in a continuous aqueous phase, is still highly fluid.

One way in which a wet foam, formed from an aqueous emulsion of a polymer, is converted into a solid cellular material so as to prevent the foam from collapsing has consisted in causing gelling of the aqueous emulsion of which the wet foam is composed. Thus, in the case of polymers which form a gelatinous, stiff continuous phase upon gelling of the aqueous emulsion, employing a gelling agent prevents the collapse of a wet foam. Such techniques are disclosed in U.S. Pat., Nos. 2,706,183 and 3,215,647. The commonly used gelling agents are ammonium acetate and sodium silico-fluoride, or blends of these two ingredients, which are incorporated into the foam after frothing by the use of a blender. The level of gelling agent requires careful, often critical, control. Too little results in heavy skin formation, inferior structure or even gross collapse, while too much results in surface imperfections.

A typical gel foam formulation for foam backing of tufted carpets is shown in Table I.

| TYPICAL GEL FOAM FORMULATION | |
| --- | --- |
| | Parts Dry Weight |
| SBR Latex | 100.0 |
| Potassium Oleate | 3.0 |
| Sulphur | 2.0 |
| Antioxidant | 1.0 |
| Pigment | as required |
| Ammonia | 0.5 |
| Filler (Whiting or Clay) | 75.0 |
| Zinc Oxide | 5.0 |
| Ammonium Acetate | 3.0 |

Weight Applied = 20–40 ozs/yd$^2$ (dry)
Total Solids = 65–70%

Another, more recently developed, method of preventing collapse of a wet foam does not include a gelling agent, hence the name "no-gelled" foam. The system works the opposite way to all other latex foam systems in that a surfactant is added which promotes excessive colloid stability, and the stability is so high that the addition of gelling agents would have little or no effect on colloid stability. To produce the final foam from such a system the water is removed, thus separating the latex particles. Once this has been done, the particles can coalesce to form a coherent mass. This system has rapidly grown in importance, largely because the system is much cheaper than the original gelled foam system.

A typical no-gel foam formulation for foam backing of tufted carpets is shown in Table II.

| TYPICAL NO-GEL FOAM FORMULATION | |
| --- | --- |
| | Parts Dry Weight |
| SBR Latex | 100.0 |
| Disodium N-octadecyl Sulfosuccinamate | 4.0 |
| Potassium Hydroxide | 0.2 |
| Sodium Hexametaphosphate | 0.5 |
| Pigment | as required |
| Filler (Whiting and/or Alumina) | 150.0 |
| Polyacrylate Thickener | 5.9 |

Weight Applied = 16–40 ozs/yd$^2$ (dry)
Total Solids = 73–78%

The purpose of the filler, obviously, is to extend the foaming material with a less expensive additive; and it can be added up to 200 parts per one hundred parts of latex without seriously detracting from the foaming properties. Whether alumina is employed as filler, either alone or in conjunction with calcium carbonate (whiting), normally depends upon the degree of fire retardancy desired.

Known foam stabilizers include disodium N-octadecyl sulfosuccinate and sodium lauryl sulfate (U.S. Pat. No. Re. 27,366 and U.S. Pat. No. 3,740,357). U.S. Pat. No. 3,823,104 discloses blends of certain saturated or unsaturated fatty alcohols and fatty acid amidos; and U.S. Pat. No. 3,856,722 discloses alkali metal salts of liquid, water-soluble higher aliphatic fatty acid ethanolamide sulfosuccinate as latex foam stabilizers. U.S. Pat. No. 3,948,822 proposes disodium N-octadecyl sulfosuccinate in combination with sodium formaldehyde sulfoxylate as an emulsifier in a no-gel system. The foam stabilizer is normally employed in an amount equal to from 1.5% to 15% of the weight of the polymer in the emulsion.

For many years the production of foam rubber backed tufted carpet has been accomplished by an aqueous latex method. This method involves preparing a tufted structure by stitching a primary backing material with yarn in such a manner as to form on the top surface of the material a pile composed of numerous closely spaced erect loops of fiber bundles, i.e., tufts of yarn. If desired, the loops can be cut. After forming the tufted structure, the bottom surface thereof is anchor-coated with a latex containing a polymer binder such as a styrene-butadiene copolymer, dried with infra red heat, and then spread with foam, which is applied via a plastic or stainless steel hose mounted on a trolley, which traverses across the carpet width. Stainless steel deckles are located on the carpet edges to maintain the foam within the carpet width. The carpet is kept under tension in order to avoid creasing and to obtain a flat foam surface. Immediately after the spreading point, the foam is passed under infrareds which gel the foam, or, in the case of no-gelled foams, merely skin the surface. The carpet is then carried through an oven, in order to drive off the moisture and cure the foam.

Carpet is passed through the oven usually in the pile down position, and modern systems incorporate a "split temperature zone", the top temperature being set to cure the foam and the bottom set in relation to the pile content. Drying and curing is usually carried out in ovens between 70 and 180 feet in length with temperatures ranging from 130° C. to 160° C. The cure or drying time of the foam is dependent basically on the wet foam density and the weight applied, as well as the efficiency and the temperature of the oven. On completion of the cure, the foam-backed carpet is cooled, batched and then packaged. A cooling section helps to minimize shrinkage of the carpet.

In the preparation and application of foamed rubber backings for carpets for sound damping, to provide walking comfort and to prevent the carpet from slipping, the most commonly employed foam stabilizer-/agent/emulsifier is disodium N-octadecyl (or disodium tallow amine) sulfosuccinamate. It is substantially water insoluble, paste like and difficult to handle. Its paste-like consistency limits somewhat its use with higher solids containing latex formulations. Unfortunately, the overall styrene-butadiene resin containing as the emulsifier, disodium tallow amine sulfosuccinamate, is not entirely satisfactory for the reason that its preparation is difficult to perform, due to the paste-like nature of the emulsifier and the composition possesses a relatively high foam density requiring large quantities of composition to cover a given area of carpet. Finally, the tallow amine-derived foaming agent represents a significant processing cost considering its proportion in the formulation. As foam rubber, mainly styrene-butadiene rubber latex, accounts for approximately 90% of the yardage of integral cushioned carpet, and with the use of foamed rubber latex backing for carpets increasing, it would be advantageous to provide a more economical foaming agent and a latex composition containing same which exhibit a low foam density, requiring the use of lower quantities of composition to cover a given area, as well as improved processing and handling characteristics.

It is, therefore, a principal object of the invention to provide a novel, relatively inexpensive foaming agent which is in a liquid, easily handleable form. It is a further object to provide a latex composition suitable as a foamed rubber backing for carpets possessing a relatively low foam density and stability to allow for substantial cost savings and complete cure without collapse of the backing. Other objects and advantages will become apparent in the following discussion.

SUMMARY OF THE INVENTION

In accordance with the present invention, disodium ethoxylated rosin half esters of sulfosuccinic acid are prepared from the one to five mole rosin ethoxylates for use as foam stabilizers in latex compositions which compositions are then formed into a non-gelling, heat-curable solid foam suitable for carpet backing.

DESCRIPTION OF THE PREFERRED EMBODIMENTS

According to the process of the invention, the disodium ethoxylated half esters of sulfosuccinic acid are prepared by making the maleic ester of the 1-mole to 5-mole rosin ethoxylate, then sulfonating by reaction with sodium sulfite or bisulfite.

Rosin derived from the distillation of tall oil consists mainly of resin acids, which are monocarboxylic acids of alkyl hydrophenanthrene. The resin acids found in tall oil rosin are abietic acid, dehydroabietic acid, dehydrodehydroabietic acid, neoabietic acid, dihydroabietic acid, tetrahydroabietic acid, palustric acid, pimaric acid, dihydropimaric acid, tetrahydropimaric acid, sandaracopimaric acid, dihydrosandaracopimaric acid, tetrasandaracopimaric acid, isopimaric acid and dihydroisopimaric acid.

Tall oil rosin is first reacted with from one to five moles of ethylene oxide per mole of rosin in the presence of from 0.1% to 1.0% by weight of potassium hydroxide catalyst at from 145° C. to 175° C. The ethylene oxide is added slowly to the rosin-KOH mixture at the rate it reacts with the rosin. Depending upon the number of moles of ethylene oxide added, the reaction may require from one to four hours. After reaction, the product is neutralized with acetic acid and cooled.

The foam stabilizer is then prepared by esterifying the ethoxylated rosin with an equal molar amount of maleic anhydride and then sulfonating the ester formed.

The esterification of the ethoxylated rosin with maleic anhydride can occur in the absence of a catalyst. However, the reaction time is shortened by adding to the reactants up to 0.5% sodium hydroxide based on the weight of the ethoxylated rosin product and the anhydride. The system is heated gradually for several hours from an initial room temperature (20° C. to 25° C.) to a final temperature of from 85° C. to 110° C. Progress of the reaction is monitored by periodic analysis by infrared spectroscopy for disappearance of the anhydride functionality. Depending upon the degree of ethoxylation of the rosin, the reaction may require from 4 to 12 hours to complete (i.e., remove the anhydride functionality). Prior to sulfonation, the product is allowed to cool to room temperature.

The sulfonation of the rosin ethoxylate maleic ester involves reacting the ester formed from the above described reaction with an equal molar amount of either sodium sulfite or sodium bisulfite. The sulfite compound is first dissolved in water; then the rosin ethoxylate maleic ester is added. The mixture is gradually heated, with stirring, to 50° C., which reaction temperature is maintained for from 2 to 4 hours.

The foam stabilizer prepared by this method is further characterized as having the formula:

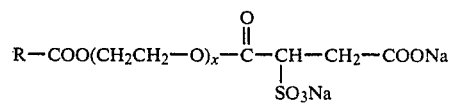

wherein x is an integer from 1 to 5 and R is a resin acid. When the rosin employed is tall oil-derived, R is a member of the group consisting of abietic acid, dehydroabietic acid, dehydrodehydroabietic acid, neoabietic acid, dihydroabietic acid, tetrahydroabietic acid, palustric acid, pimaric acid, dihydropimaric acid, tetrahydropimaric acid, sandaracopimaric acid, dihydrosandaracopimaric acid, tetrasandaracopimaric acid, isopimaric acid and dihydroisopimaric acid.

The following example describes the preparation of the disodium ethoxylated rosin half ester of succinic acid prepared from the product of the reaction of three moles of ethylene oxide with tall oil rosin.

EXAMPLE 1

Esterification

In a one-liter, three-neck flask equipped with a stirrer, trap for water removal and reflux condenser was charged with 453 grams of the three-mole ethoxylate of rosin, 101 grams of crushed maleic anhydride, and 0.5 gram of 50% NaOH. The system was heated gradually for 6 hours to a final temperature of 94° C. Samples were removed at hourly intervals during the reaction period and analyzed by infrared spectroscopy for disappearance of the anhydride functionality.

Sulfonation

Into a beaker equipped with a magnetic stirring bar were weighed 12.6 grams of sodium sulfite and 200 grams of water. After the sodium sulfite had dissolved completely, 55.4 grams of the rosin 3-mole ethoxylate maleic ester from the previous reaction were added; and the system was stirred 4 hours at 50° C. on a hot plate. Sufficient water was added to replace that lost by evaporation and return the system to 25.4% solids.

The foam stabilizer thus prepared is characterized as having the formula:

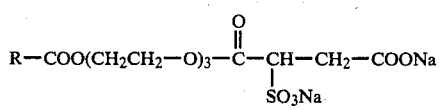

where R is a resin acid selected from the group consisting of abietic acid, dehydroabietic acid, dehydrodehydroabietic acid, neoabietic acid, dihydroabietic acid, tetrahydroabietic acid, palustric acid, pimaric acid, dihydropimaric acid, tetrahydropimaric acid, sandaracopimaric acid, dihydrosandaracopimaric acid, tetrasandaracopimaric acid, isopimaric acid and dihydroisopimaric acid.

The amount of the novel foam stabilizer used in an emulsion that is foamed in the practice of the present invention is an amount equal to from 1.5% to 15% on the dry weight of the polymer in the emulsion. Higher amounts can be used but may detract from the properties of the final product. Based on product properties, from 3% to 6% based on polymer weight is preferred. While the foam stabilizer of the present invention adequately performs the function of preventing collapse of the foam during the drying operation and preventing migration of the polymer particles to the surface with the water when employed as the only foam stabilizer in the formulation, the foam stabilizing disodium ethoxylated rosin half esters of sulfosuccinic acid of the present invention also may be employed in conjunction with one or more known foam stabilizers.

EXAMPLE 2

Several samples of the sulfosuccinate esters of tall oil rosin ethoxylated with three moles of ethylene oxide were prepared as described above and employed as foam stabilizers in the preparation of styrene-butadiene foamed rubber according to the formulation in Table III.

TABLE III

| Ingredient | Dry Weight (g) |
| --- | --- |
| Styrene-Butadiene Latex* | 100 |
| Foam Stabilizing Agent | 4.0 |
| Potassium Hydroxide | .20** |
| Potassium Hexametaphosphate | .5 |
| Color*** | 0.5 |
| Bayco ® #7 (CaCO₃) Filler | 110 |
| Hydrated Alumina | 40 |
| Polycure ® 590 Curing Agent | 5.9 |
| Water Added to 78% Solids | |

*Polysar ® Latex 730, (70% solids).
**Slightly more or slightly less KOH may be required to assure pH of the mixture between from 10.5 to 11.5 after combining all ingredients and prior to frothing.
***Optional.

The ingredients were admixed in the order shown, except the water was added before the color. Air was then whipped into 600 grams of the compounded latex using a Hobart mixer. The foam densities of the resultant foamed latices were measured for comparison with latices foamed by the identical method except using disodium N-octadecyl sulfosuccinamate as the foam stabilizer. This comparison is presented in Table IV.

TABLE IV

FOAM DENSITIES (gms./l.) OF LATEX COMPOSITIONS

| Sample No. | Foaming Stabilizer | |
| --- | --- | --- |
| | Disodium N-octadecyl Sulfosuccinamate | Disodium Ethoxylated Rosin Sulfosuccinate |
| 1 | 244 | |
| 2 | 232 | |
| 3 | | 221.5 |
| 4 | | 225 |
| 5 | | 223 |
| 6 | | 223.9 |
| 7 | | 224.5 |
| 8 | | 217.5 |

The lower foam densities achieved using the foam stabilizer of the present invention result in less foamed latex material required for each square yard of carpeting to provide the same thickness of foamed rubber backing as when disodium N-octadecyl sulfosuccinamate is used. This savings in materials equates to a savings in cost.

EXAMPLE 3

Several of the compounded and foamed latices of Example 2 were applied to the backsides of carpet samples roughly 7 inches by 10 inches with two ¼-inch diameter steel rods laid along either side edge of the carpet as metering gauges. A metal straight edge was then drawn down over the steel rods to give a ¼-inch thickness over the carpet back surface. The backing is cured by placing the carpet, pile side down, under a bank of six infrared 250-watt heat lamps set up in two columns of three lamps 19½ inches above the carpet back surface. The heat lamp exposure lasts for exactly one minute. The carpet is then placed in an over at 135° C. for 30 minutes.

Evaluation of the prepared carpet samples unexpectedly showed that the foam backing of the carpet samples backed with the foamed latex composition of the invention possessed a "stiffer" yet equally resilient foam as the carpet sample backed with the foamed latex composition prepared using disodium N-octadecyl sulfosuccinamate as the foam stabilizer. Table V presents the average hardness values based upon ten readings per sample using a type 00 Shore instrument from the Shore Instrument & Manufacturing Company, Jamaica, New York.

TABLE V
AVERAGE SHORE HARDNESS VALUES OF FOAMED RUBBER CARPET BACKINGS

| Sample No. | Foam Stabilizer | |
|---|---|---|
| | Disodium N-octadecyl Sulfosuccinamate | Disodium Ethoxylated Rosin Sulfosuccinate |
| 2 | 24.9 | |
| 6 | | 35.2 |
| 7 | | 33.9 |
| 8 | | 34.4 |

The higher values obtained for the foamed rubber carpet backings prepared with the invention foam stabilizer indicate (1) an enhanced cushioning effect is achieved with the same thickness backing as compared with backing prepared using disodium N-octadecyl sulfosuccinamate and (2) an equal cushioning effect can be achieved with a thinner backing than a backing prepared using disodium N-octadecyl sulfosuccinamate.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A compound of the formula:

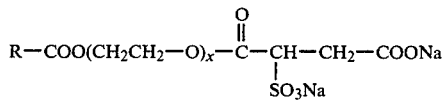

wherein x is an integer from 1 to 5 and R is a resin acid.

2. The compound of claim 1 wherein R is a resin acid selected from the group consisting of abietic acid, dehydroabietic acid, dehydrodehydroabietic acid, neoabietic acid, dihydroabietic acid, tetrahydroabietic acid, palustric acid, pimaric acid, dihydropimaric acid, tetrahydropimaric acid, sandaracopimaric acid, dihydrosandaracopimaric acid, tetrasandaracopimaric acid, isopimaric acid and dihydroisopimaric acid.

3. The compound of claim 1 or 2 wherein x is the integer 3.

4. A process for preparing foam stabilizing disodium ethoxylated rosin half esters of sulfosuccinic acid, comprising the steps of
    (a) reacting tall oil rosin with from one to five moles ethylene oxide per mole of rosin in the presence of from 0.1% to 1.0% by weight of potassium hydroxide catalyst at from 145° C. to 175° C. for from one to four hours, neutralizing with acetic acid and allowing the product to cool,
    (b) reacting the ethoxylated rosin product of step (a) with an equal molar amount of maleic anhydride in the presence of up to 0.05% sodium hydroxide based on the weight of the rosin product and the anhydride while gradually increasing the heat of reaction to a final temperature of from 85° C. to 110° C. until the anhydride functionality is removed, allowing the product to cool to room temperature, and
    (c) reacting the product of step (b) with an aqueous solution of an equal molar amount of a sulfonating agent selected from the group consisting of sodium sulfite and sodium bisulfite for 1 to 6 hours at from 45° C. to 80° C.

5. The process according to claim 4 wherein the tall oil rosin in step (a) is reacted with three moles ethylene oxide per mole of rosin.

6. The process according to claim 4 or 5 wherein the sulfonating agent in step (c) is sodium sulfite.

7. The process according to claim 4 or 5 wherein the sulfonating agent in step (c) is sodium bisulfite.

8. A latex composition which comprises a latex rubber and at least one foam stabilizer having the formula:

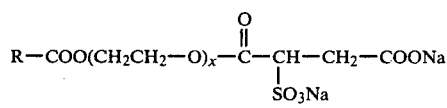

wherein x is an integer from 1 to 5 and R is a resin acid.

9. The latex composition of claim 8 wherein R is a resin acid selected from the group consisting of abietic acid, dehydroabietic acid, dehydrodehydroabietic acid, neoabietic acid, dihydroabietic acid, tetrahydroabietic acid, palustric acid, pimaric acid, dihydropimaric acid, tetrahydropimaric acid, sandaracopimaric acid, dihydrosandaracopimaric acid, tetrasandaracopimaric acid, isopimaric acid and dihydroisopimaric acid.

10. The latex composition of claim 8 or 9 wherein x is 3.

11. The latex composition of claim 8 or 9 wherein the latex rubber is styrene-butadiene latex.

12. The latex composition of claim 8 or 9 wherein the latex rubber is carboxylated styrene-butadiene latex.

13. A process for preparing latex compositions for use as foamed rubber backing for carpets comprising the steps of
    (a) forming a mixture of 100 parts rubber latex and from 1.5 parts to 15 parts of a disodium ethoxylated rosin half ester of sulfosuccinic acid prepared from the 1-5 mole rosin ethoxylates, and
    (b) adding an amount of potassium hydroxide to give the mixture a pH of from 10.5 to 11.5, 0.5 part potassium hexametaphosphate, based on the latex dry weight, an amount of water to give the mixture a 78% solids content, up to 200 parts of a filler material and 5.9 parts of a curing agent.

14. The process of claim 13 wherein the rubber latex is styrene-butadiene latex.

15. The process of claim 13 wherein the rubber latex is carboxylated styrene-butadiene latex.

16. The process of claim 13, 14 or 15 wherein the disodium ethoxylated rosin half ester of sulfosuccinic acid is prepared from the 3-mole rosin ethoxylate.

17. The process of claim 13 wherein the filler material is added in the amount of 110 parts calcium carbonate and 40 parts hydrated alumina.

* * * * *